US006846347B2

(12) United States Patent
Phillips et al.

(10) Patent No.: US 6,846,347 B2
(45) Date of Patent: Jan. 25, 2005

(54) LIFE SUPPORT SYSTEM (75) Inventors: Robert John Phillips, Devon (GB); Adrian Simons, Somerset (GB); Norman Francis Charles Barns, Somerset (GB)

(73) Assignee: Honeywell Normaliar-Garrett (Holdings) Limited, Yeovil (GB)

( * ) Notice: Subject to any disclaimer, the term of this patent is extended or adjusted under 35 U.S.C. 154(b) by 0 days.

(21) Appl. No.: 10/332,321

(22) PCT Filed: Jul. 5, 2001

(86) PCT No.: PCT/GB01/03013

§ 371 (c)(1),
(2), (4) Date: Jun. 18, 2003

(87) PCT Pub. No.: WO02/04076

PCT Pub. Date: Jan. 17, 2002

(65) Prior Publication Data

US 2004/0083886 A1 May 6, 2004

(30) Foreign Application Priority Data

Jul. 11, 2000 (GB) ............................. 0016893

(51) Int. Cl.[7] ............................. B01D 53/047
(52) U.S. Cl. ............ 95/8; 95/19; 95/96; 95/130; 96/111; 96/113; 96/130; 96/144
(58) Field of Search .................. 95/8, 11, 12, 19, 95/21, 22, 96–106, 130, 138; 96/111, 113, 114, 144, 130–132

(56) References Cited

U.S. PATENT DOCUMENTS

| | | | | |
|---|---|---|---|---|
| 3,922,149 A | * | 11/1975 | Ruder et al. .................. 95/22 |
| 3,923,477 A | * | 12/1975 | Armond et al. ............... 95/103 |
| 4,259,091 A | | 3/1981 | Benkmann |
| 4,543,109 A | * | 9/1985 | Hamlin et al. ................. 95/98 |
| 4,687,013 A | * | 8/1987 | Stevenson ..................... 137/7 |
| 4,737,170 A | | 4/1988 | Searle |
| 4,769,051 A | * | 9/1988 | Defrancesco ................ 96/128 |
| 5,071,453 A | * | 12/1991 | Hradek et al. ............... 96/111 |
| 5,429,663 A | * | 7/1995 | Cassidy et al. ................ 95/21 |
| 5,578,115 A | | 11/1996 | Cole |
| 5,809,999 A | * | 9/1998 | Lang ..................... 128/200.24 |
| 5,827,358 A | | 10/1998 | Kulish et al. |
| 6,004,378 A | * | 12/1999 | Reiss et al. .................... 95/99 |
| 6,077,331 A | * | 6/2000 | Phillips ........................ 95/12 |
| 6,146,450 A | * | 11/2000 | Duhayer et al. ............. 96/130 |
| 6,346,139 B1 | * | 2/2002 | Czabala ....................... 95/130 |
| 2003/0196550 A1 | * | 10/2003 | Keefer et al. .................. 95/96 |
| 2003/0233936 A1 | * | 12/2003 | Crome .......................... 95/96 |

FOREIGN PATENT DOCUMENTS

| | | |
|---|---|---|
| DE | 33 04 227 A | 8/1984 |
| EP | 0 391 607 A | 10/1990 |
| EP | 0 827 907 A | 3/1998 |

* cited by examiner

Primary Examiner—Robert H. Spitzer
(74) Attorney, Agent, or Firm—Harrison & Egbert (57) ABSTRACT

A method of operating a life support system for an aircraft, the system including a plurality of oxygen supply apparatus, each of which in use is operable to supply product gas, which may be pure oxygen or oxygen enriched gas, to a breathing gas supply apparatus, at least one of the oxygen supply apparatus being a main oxygen supply apparatus and the remainder of the oxygen supply apparatus being auxiliary oxygen supply apparatus, the main oxygen supply apparatus being operable independently of the auxiliary oxygen supply apparatus, characterized in that the method includes operating the main oxygen supply apparatus and supplying product gas to each of the auxiliary oxygen supply apparatus.

18 Claims, 4 Drawing Sheets

LIFE SUPPORT SYSTEM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a method of operating a life support system for an aircraft, where the system has means for supplying oxygen gas or oxygen enriched gas for breathing.

BACKGROUND OF THE INVENTION

Conventionally, in an aircraft of the kind which has a crew or passenger cabin which is pressurized to enable the aircraft to fly at high altitudes without providing a local oxygen supply to each passenger and crew member e.g. via a breathing mask, an emergency oxygen supply is available for use in the event of a demand or an increased demand for oxygen or oxygen enriched gas, for example in the event that the cabin becomes depressurized. Such emergency oxygen supply may be provided from compressed gas storage containers and/or by combining two or more chemicals which undergo a reaction which produces oxygen gas (e.g. chlorate candles), and would be supplied to passengers and crew by individual breathing masks.

By providing such an emergency supply of oxygen gas, time is available for a pilot to reduce flying height to an altitude where the crew and passengers may again breath atmospheric gases. However such an emergency supply is, only available for a short period of time.

It is usual practice particularly in the case of civilian aircraft, for flying routes taken by aircraft to be arranged such that in the event of an emergency, such as cabin decompression, the aircraft is within 30 minutes or so flying time from land. Thus for safety's sake, the route taken by an aircraft may not be the shortest and most economical route.

Moreover, even though an aircraft may be within 30 minutes flying time from land, often a suitable landing ground is not available for landing the aircraft within this flying range e.g. the nearest land may be hostile territory, and where an aircraft is constrained to fly at relatively low altitude, typically less than 10,000 feet, during low altitude flight over some land masses, the aircraft may encounter terrain at a height at or greater than 10,000 feet, or adverse weather conditions.

It is known more particularly for military aircraft, for an emergency oxygen supply apparatus to be provided which is capable of supplying oxygen indefinitely. Such oxygen supply apparatus may be of the molecular sieve bed type which when operated adsorbs oxygen gas from a gas supply thus to provide a gas which is sufficiently oxygen enriched for breathing at higher altitudes, or may be of the gas permeable membrane type which allows oxygen or non-oxygen gas to permeate through a membrane thus to enrich a supply gas for breathing, and it has also been proposed to supply oxygen using a ceramic oxygen generator to separate oxygen from a gas supply.

Such oxygen supply apparatus tend to work most efficiently particularly in terms of start-up time, where of relatively small capacity. To use such technology in a civilian aircraft with a large number of passengers, would thus require a plurality of such oxygen supply apparatus. For passenger aircraft now being proposed which will be capable of carrying 700 passengers or more, it will be appreciated that a substantial number of oxygen supply apparatus would be required to ensure an adequate oxygen supply for all passengers in the event of an emergency which results in increased demand for oxygen. Additionally, because such oxygen supply apparatus are not readily able to produce oxygen instantly, conventionally it would still be necessary to carry e.g. compressed oxygen which can be used in the event of an emergency decompression, until such oxygen supply apparatus come on line. All this adds to the weight of the aircraft, which is undesirable for economic reasons.

BRIEF SUMMARY OF THE INVENTION

The large aircraft now being proposed will be intended to fly at greater heights than conventional, e.g. heights above 40,000 feet, and thus the emergency gas requirement is not only enlarged by the shear number of passengers, but also by the time requirement for the aircraft safely to descend from these increased heights, to a safe low flying altitude at which the passengers can breath atmospheric gases.

Also, where such oxygen supply apparatus includes one or more molecular sieve beds, it is desirable to keep the molecular sieve beds dry and free from contaminates such as non-oxygen gas, in order that in the unlikely event of an emergency, rapid production of high concentration oxygen is possible. To enable this to be achieved, periodic operation of the molecular sieve beds is necessary.

In accordance with a first aspect of the invention, a method of operating a life support system for an aircraft is provided, the system including a plurality of oxygen supply apparatus, each of which in use is operable to supply product gas, which may be pure oxygen or oxygen enriched gas, to a breathing gas supply apparatus, at least one of the oxygen supply apparatus, being a main oxygen supply apparatus and the remainder of the oxygen supply apparatus being auxiliary oxygen supply apparatus, the main oxygen supply apparatus being operable independently of the auxiliary oxygen supply apparatus, the method including operating the main oxygen supply apparatus in a non-emergency situation, and supplying product gas to each of the auxiliary oxygen supply apparatus.

By performing the method of the present invention, at least the following advantages are realized which make the provision of such a life support system practical for an aircraft capable of high altitude flight, and carrying a large number of passengers.

First, the auxiliary oxygen supply apparatus may be of the molecular sieve bed type, and the action of supplying product gas thereto from the main oxygen supply apparatus, purges and thus conditions the molecular sieve beds ready for use, thus reducing start-up time. Of course, the main oxygen supply apparatus may be of the molecular sieve bed type too, although other kinds of main oxygen supply apparatus such as permeable membrane or even ceramic oxygen generator type oxygen supply apparatus may be provided for the main oxygen supply apparatus as desired.

It is envisaged that where all of the oxygen supply apparatus are of the molecular sieve bed type, the invention may include sequentially selecting and operating an oxygen supply apparatus to be the main oxygen supply apparatus such that, over repeated performances of the invention, all of the oxygen supply apparatus would be selected to be the main oxygen supply apparatus so that all of the molecular beds would be used generally to the same extent and thus be of generally the same operating age.

Of course, it is undesirable to operate the oxygen supply apparatus more often than is necessary, because this reduces molecular sieve bed life. By performing the invention only periodically, e.g. on the ground prior to each or a predetermined number of flights, or only after a given number of flying hours, the condition of each of the beds can be maintained, with minimal usage of the individual beds.

The auxiliary oxygen supply apparatus may be purged one at a time, in groups or all together, as desired.

A second advantage of the present invention is that by supplying oxygen to each of the auxiliary oxygen supply apparatus, the auxiliary oxygen supply apparatus, and any ancillary connection hoses and the like, may be used to store the supplied gas, so that in the event of increased demand for oxygen or oxygen enriched gas, such as an emergency decompression, a supply of oxygen or oxygen enriched gas may thus immediately be available for breathing while the auxiliary oxygen supply apparatus are brought on line. Thus the requirement for carrying additionally, compressed oxygen in heavy storage containers, may be at least reduced, and may be alleviated altogether, thus saving weight and improving safety by alleviating the risks involved in carrying substantial volumes of compressed oxygen.

Moreover elements of the life support system may be combined with elements of the usual environmental control system which is used under normal flying conditions to maintain a desired oxygen concentration in the pressurized cabin, thus again leading to weight reduction.

Where the auxiliary oxygen supply apparatus are not used for storing oxygen, at high altitudes, the molecular sieve beds thereof may be opened to low pressure atmosphere, which will result in the beds being maintained dry and in condition, free of contaminates, ready for use.

By utilizing the present invention, in the event of an emergency decompression, there is no need for a pilot to reduce height to conventionally low altitudes, but the aircraft may continue to be flown at a reduced but higher altitude, of say 20,000–25,000 feet. This will mean that there should be no risk of encountering dangerously high terrain or adverse weather conditions, and also the flying range of the aircraft even within the 30 minutes conventionally provided for, will be greater as the aircraft can fly at greater altitude. Thus without compromising safety, the aircraft may normally be flown along more economic and shorter routes which would otherwise bring the aircraft out of 30 minutes flying time range of land under emergency conditions flying at low altitude, resulting in substantial fuel savings in normal aircraft operation. Moreover, even in an emergency situation in which the aircraft has encountered cabin decompression, there is the possibility of the aircraft being continued to be flown to its intended destination if this is close enough.

Preferably at least the auxiliary oxygen supply apparatus at least, each includes at least two active molecular sieve beds which when operated e.g. in an emergency, are operated in tandem, symmetrically or non-symmetrically, so that whilst one sieve bed is adsorbing non-oxygen gas from a pressurized gas supply, the other bed is being purged of non-oxygen gas by subjecting the bed to lower pressure. Where each auxiliary oxygen supply apparatus includes three molecular sieve beds, the three beds may be operated such that at least one of the beds is adsorbing non-oxygen gas from a pressurized gas supply, whilst another of the beds is being purged of non-oxygen gas.

Each of the main and auxiliary oxygen supply apparatus may have an inlet for supply gas, such as pressurized air bled from an engine compressor, an outlet for the product gas and a vent which when the bed is in use, is opened to low pressure atmosphere during purging of the bed. The inlets for the auxiliary oxygen supply apparatus and the vents may each include a valve device which may be closed while the main oxygen supply apparatus is operated, to enable the auxiliary supply apparatus to be filled with product gas for storage when the main oxygen supply apparatus is operated.

The method of the invention may include testing the performance of each of the auxiliary oxygen supply apparatus by sequentially operating each of the auxiliary oxygen supply apparatus and monitoring at least one of the pressure of, and oxygen concentration in, the product gas supplied, in the breathing gas supply apparatus.

According to a second aspect of the invention we provided a life support system for an aircraft which system includes a plurality of oxygen supply apparatus, each of which in use is operable to supply product gas, which may be pure oxygen or oxygen enriched gas, to a breathing gas supply apparatus, at least one of the oxygen supply apparatus being a main oxygen supply apparatus and the remainder of the oxygen supply apparatus being auxiliary oxygen supply apparatus, the main oxygen supply apparatus being operable independently of the auxiliary oxygen supply apparatus, and which system is capable of operation according to a method including operating the main oxygen supply apparatus, in a non-emergency situation, and supplying product gas to each of the auxiliary oxygen supply apparatus.

The system may include an ancillary oxygen supply apparatus for use in the event of an emergency by the crew, there being apparatus to allow a supply of product gas from the main and auxiliary oxygen supply apparatus to be used to supplement or replace the product gas supply provided by the ancillary supply apparatus, but to prevent product gas from the ancillary oxygen supply apparatus passing into the breathing gas supply apparatus of the main and auxiliary oxygen supply apparatus.

The main and auxiliary supply apparatus may be arranged in a linear or radial array with a gas supply inlet and/or product gas outlet for each oxygen supply apparatus provided by a common plenum.

According to a third aspect of the invention, a method of operating a passenger aircraft in the event of an emergency cabin decompression is provided, the method including operating a life support system which system includes a plurality of oxygen supply apparatus, each of which in use is operable to supply product gas, which may be pure oxygen or oxygen enriched gas, to a breathing gas supply apparatus, at least one of the oxygen supply apparatus being a main oxygen supply apparatus and the remainder of the oxygen supply apparatus being auxiliary oxygen supply apparatus, the main oxygen supply apparatus being operable independently of the auxiliary oxygen supply apparatus including opening the main oxygen supply apparatus and supplying product gas to each of the auxiliary oxygen supply apparatus. The method and reducing flying altitude to a holding altitude of greater than 10,000 feet, preferably greater than 15,000 feet, and more preferably of about 20,000 feet and continuing to fly the aircraft at the holding altitude while the passengers are supplied with breathing gas from the life support system.

According to a fourth aspect of the invention, an aircraft having a life support system is provided, according to the second aspect of the invention.

BRIEF DESCRIPTION OF THE SEVERAL VIEWS OF THE DRAWINGS

The invention will now be described with reference to the accompanying drawings in which.

DETAILED DESCRIPTION OF THE INVENTION

Figure 1:
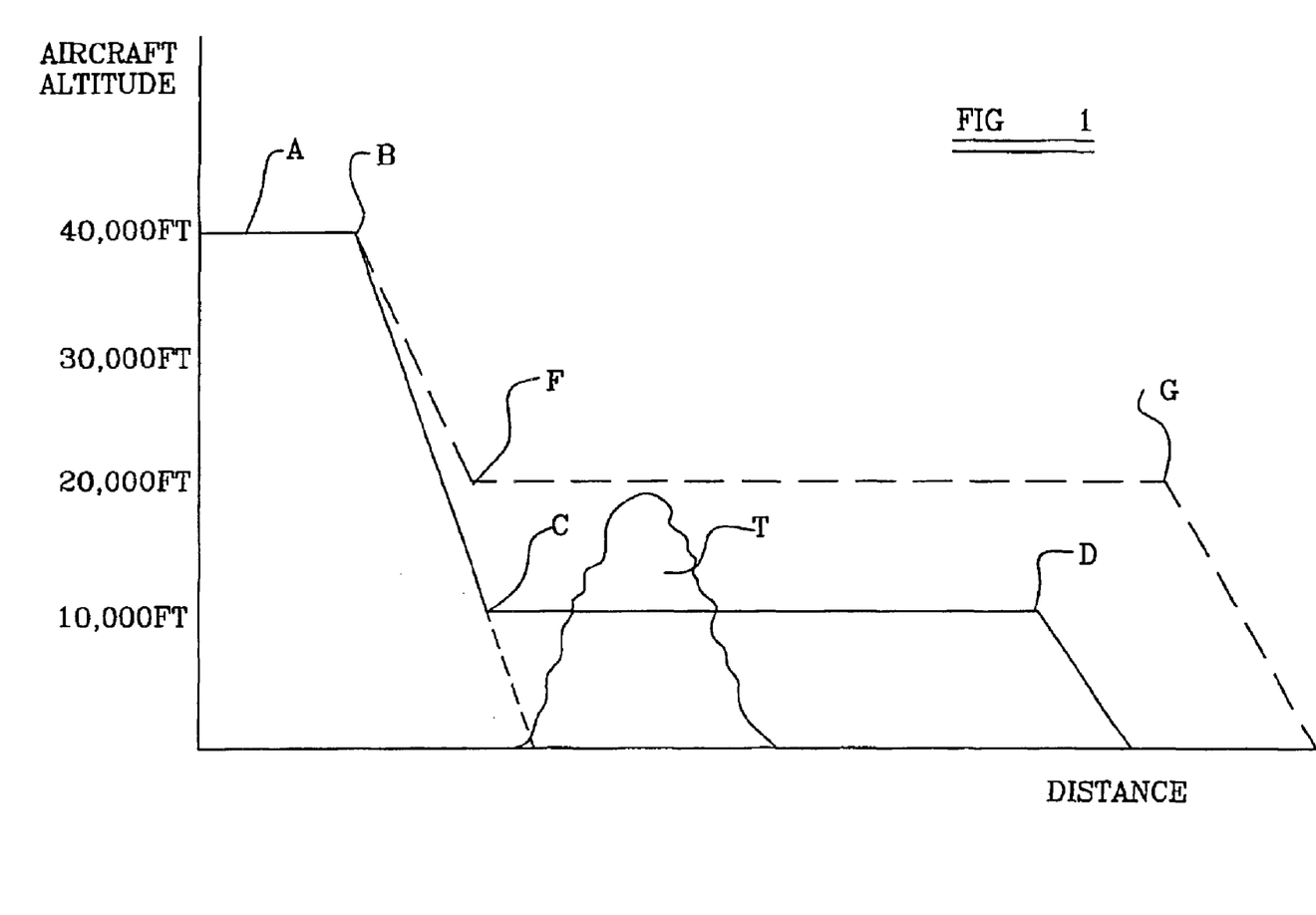
FIG. 1 is an illustrative graph showing an aircraft flight profile in the event of an emergency such, as cabin decompression which results in increased demand for oxygen or oxygen enriched gas, both conventionally and using a life support system according to the present invention.

Referring first to FIG. 1 there is shown a typical flight profile of an aircraft in the event of an emergency decompression.

In this example, an aircraft flying at 40,000 feet (line A), when experiencing an emergency such as cabin decompression at B, which result in increased demand for oxygen or oxygen enriched gas, would rapidly descend to a low altitude C of 10,000 feet or less. During this descent, an emergency supply of oxygen would be provided to crew and passengers of the aircraft, from compressed oxygen storage containers, or as a result of a chemical reaction between two or more reagents. At 10,000 feet C, the passengers at least can safely breath atmospheric air. The aircraft continues to fly at this low altitude until it is safe to descent to land D, or until the pilot decides it is safer to ditch the aircraft in the sea.

It will be appreciated that terrain T in many land masses extends above 10,000 feet and thus conventionally there is a risk that during low altitude flight such terrain will be encountered. Moreover, because the aircraft has to fly at a low altitude, its flying range is restricted within a 30 minute period during which it is preferred to land the aircraft or by the amount of fuel available.

By using a life support system according to the present invention, an alternative yet safe flight profile is possible, in which upon decompression B the aircraft descends to a safe-holding altitude F, which would be above 10,000 feet, and preferably is at least 15,000 feet and more preferably about 20,000–25,000 feet, whilst the passengers and crew are supplied with oxygen enriched gas for breathing by the life support system. By flying at this enhanced height, the aircraft flying range within the target 30 minutes, is increased, giving more opportunity for the pilot to find a suitable airfield or other landing spot and using less fuel.

Thus, during the 30 minute flying time target the aircraft may fly farther before descending for landing, G.

Utilizing the present invention, it is therefore possible for an aircraft to be routed to fly along shorter, more economic routes to a destination, without compromising safety, and without compromising the target 30 minutes to land in the event of an emergency.

Figure 2:
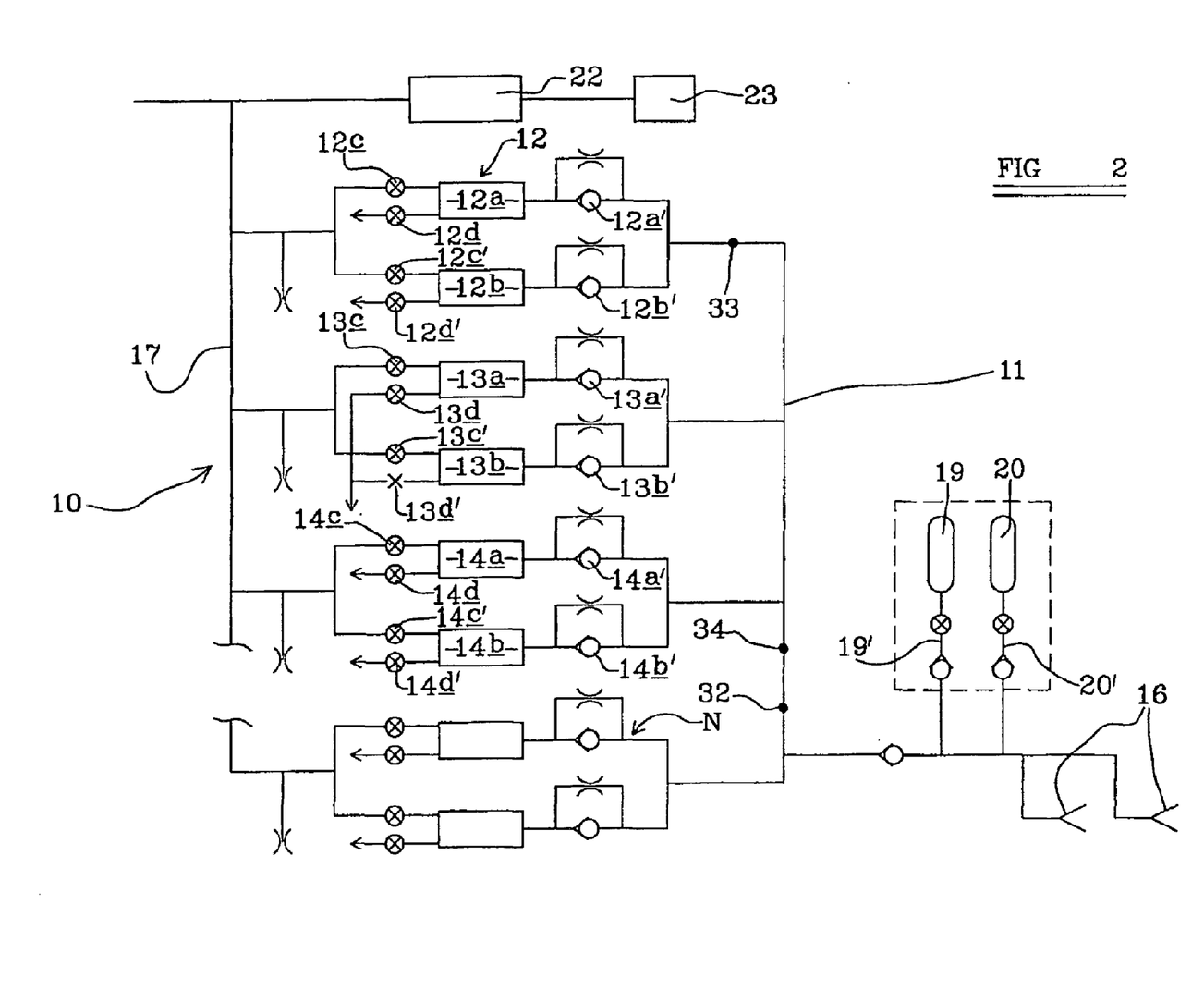
FIG. 2 is an illustrative view of a life support system for use in the present invention.

Referring now to FIG. 2, an aircraft life support system 10 is illustrated. This system 10 includes a breathing gas supply apparatus, being a line 11 common to a plurality of oxygen supply apparatus 12, 13, 14 . . . N. The oxygen supply apparatus 12, 13, 14 . . . N are operable to supply a product gas which may be pure oxygen, but which in this example is oxygen enriched gas. The gas supply line 11 delivers oxygen enriched gas for breathing to individual breathing masks 16 to be worn by passengers in the aircraft in the event of an emergency cabin decompression.

Each oxygen supply apparatus includes in this example, a pair of molecular sieve beds 12a, 12b, 13a, 13b etc. the beds 12a, 12b, 13a, 13b etc, of each pair being operable in tandem so that in operation, one of the beds 12a, 13a etc. of the pair is actively adsorbing non-oxygen gas from a pressurized gas supply, whilst the other bed 12b, 13b etc. of each pair is being purged of non-oxygen gas under low pressure.

The construction and operation of molecular sieve bed type oxygen supply apparatus or generators, known as MSOGS is well known and a detailed description of the operation of such MSOGS is not considered necessary for the understanding of the invention. Typically though, the molecular sieve beds would include a bed material such as Zeolite which adsorbs non-oxygen gas when a pressurized gas supply 17, for example bled from an engine compressor, is fed to the bed, and which is purged of non-oxygen gas when an inlet valve 12c, 12c', 13c, 13c' etc. is closed, and a vent outlet valve 12d, 12d', 13d, 13d' etc. is opened to low pressure atmosphere. To assist purging, a small volume of oxygen enriched gas is passed over the bed during purging.

Each molecular sieve bed 12a, 12b, 13a, 13b etc. of each pair, has an oxygen supply non return outlet valve 12a', 12b', 13a', 13b' etc. which permits oxygen generated in the beds 12a, 12b, 13a, 13b etc. to pass to the breathing gas supply line 11.

There is a path for oxygen from the breathing gas supply line 11 past the non return outlet valves 12a', 12b', 13a', 13b' etc., to each of the beds 12a, 12b, 13a, 13b etc., via a small orifice, which permits a small flow of oxygen to each of the beds during purging.

Indicated in FIG. 2 in dotted lines, are a pair of compressed oxygen containers 19, 20 or bottles, each with its own non return outlet valve device 19', 20'. It will be appreciated from the description below that the volume of such compressed stored gas may be small; or the bottles 19, 20 may not be required at all, by utilizing the system and operating method of the invention.

The inlet and outlet valves 12c, 12d etc. of the molecular sieve beds 12a, 12b, 13a, 13b etc. are all controlled by an electronic control unit 22, to which inputs may be provided from a pressure sensing device 23, which is operable to sense any sudden depressurization within the cabin of the aircraft.

Conventionally in the event of such emergency decompression, an emergency supply of oxygen gas would be provided to the individual breathing masks 16 for use by passengers, from the stored compressed oxygen supply 19, 20. Sufficient oxygen would need to be stored to allow the passengers to breath the emergency gas while the aircraft descends to the low altitude, according to the conventional flight profile A, C indicated in FIG. 1.

Where there are substantial number of passengers present, and the aircraft is flying at a very high altitude, a substantial supply of oxygen would be required conventionally, requiring several large and heavy storage containers 19,20.

However, in accordance with the present invention, in the event of an emergency decompression, the oxygen supply apparatus 12, 13 etc. are immediately operated to generate oxygen from the gas supply, and to provide the oxygen to the breathing gas supply line 11. If the MSOGS have not been designed to provide full passenger protection at higher altitudes, and an oxygen supply is demanded immediately upon decompression, either a small supply of oxygen e.g. in small storage containers 19, 20 may be provided, sufficient to supply breathing gas until the oxygen supply apparatus 12, 13 etc. are brought on line, and/or a supply of oxygen gas stored in the oxygen supply apparatus 12, 13 etc. and in the breathing gas supply apparatus 11 as hereinafter explained, may be made available to the passengers.

It is desirable to keep the molecular sieve bed material dry and clean of non-oxygen contaminants. Because the oxygen supply apparatus 12, 13 etc. are only intended for use in an emergency situation, and thus rarely, if ever, to maintain the MSOGS in a working condition, the following method is performed, preferably while the aircraft is on the ground prior to flight or otherwise when the aircraft is not likely to be subjected to an emergency cabin decompression.

One of the oxygen supply apparatus 12, 13 etc., in this example oxygen supply apparatus 12, or at least one of the molecular sieve beds 12a, 13a of the oxygen supply apparatus 12, is designated a main oxygen supply apparatus, whilst each of the others is designated an auxiliary oxygen supply apparatus. The main oxygen supply apparatus 12 is operated to produce dry oxygen enriched gas which is fed into the breathing gas supply line 11, and hence via the orifices past the non-return valves 13a', 13b', 14a', 14b' etc. or otherwise to each of the molecular sieve beds 13a, 13b, 14a, 14b etc. of the auxiliary oxygen supply apparatus 13, 14 etc. whilst the vent outlet valves 13d, 13d', 14d, 14d' etc. are open, so that the Zeolite or other molecular sieve material of the MSOGS is purged of non-oxygen gas. This will also pre-oxygenate and condition the beds ready for use should the need arise.

Next, the main oxygen supply apparatus 12 is continued to be operated, while vent outlet valves 13d, 13d', 14d, 14d' etc. of the auxiliary oxygen supply apparatus are closed. Thus each MSOGS 13a, 13b, 14a, 14b etc. and the breathing gas supply line 11 will fill with oxygen supplied by main oxygen supply apparatus 12 up to the pressure of the supply gas inlet 17.

Provided that the vent outlet valves 12d, 12d', 13d, 13d' etc. are able to maintain the store of oxygen in the oxygen supply apparatus 12, 13 etc. and depending on the capacity of the oxygen supply apparatus 12, 13, etc. and the breathing gas supply line 11 etc. an oxygen supply will be immediately available for breathing in the event that a sudden cabin decompression is experienced and thus the compressed oxygen bottles 19, 20 may not be required at all.

An indicating means, such as a pressure sensor, may be provided to indicate the pressure of the oxygen stored in the oxygen supply apparatus 12, 13, etc.

Figure 4:
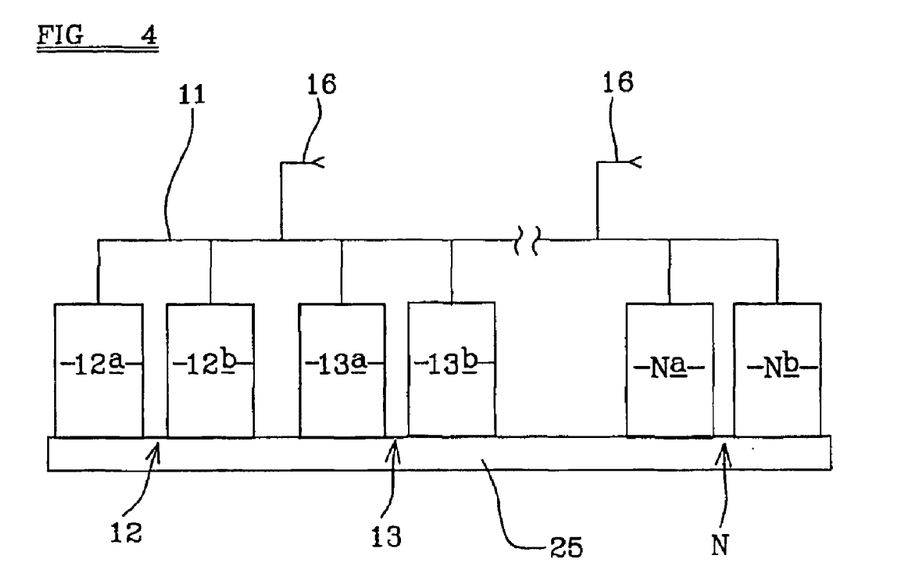
FIG. 4 is an illustrative view of a practical arrangement of oxygen supply apparatus of a system for use in the present invention.
Figure 5A:
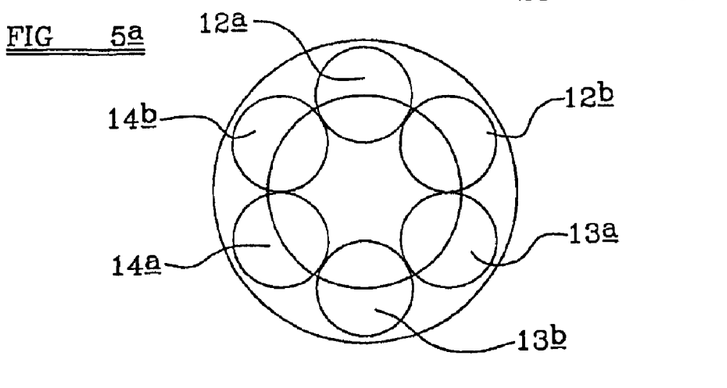
FIGS. 5a and 5b are plan and side illustrative views of an alternative practical arrangement of oxygen supply apparatus of a life support system.
Figure 5B:
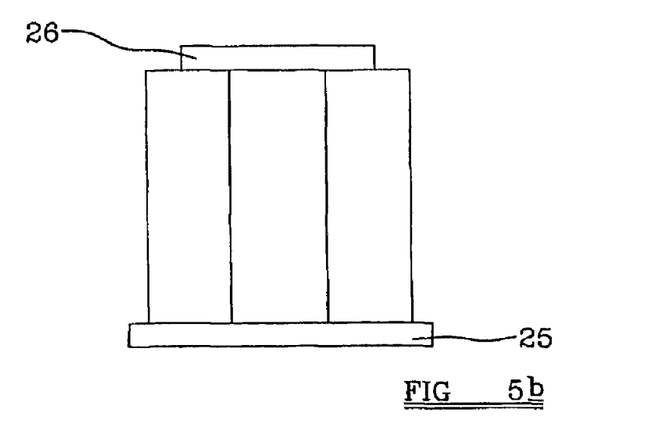

Any number of oxygen supply apparatus 12, 13 etc. may be provided adequate to provide sufficient oxygen for breathing for a prolonged period e.g. at least 30 minutes, and to provide an adequately fast start-up. A greater umber of smaller capacity oxygen supply apparatus 12, 13 etc. may be provided where this is essential for packaging within the aircraft or a smaller number of greater capacity, oxygen supply apparatus 12, 13 etc. may be provided where there is space. The oxygen supply apparatus 12, 13. etc. may be arranged in a linear array as indicated in FIG. 4, and may receive supply air from a common plenum 25, and/or supply air to a common plenum, or the oxygen supply apparatus 12, 13 etc. may be provided in a radial array as indicated in FIG. 5b, again with a common air supply plenum 25 and/or breathing gas supply plenum 26.

Where the vent valves 12d, 12d', 13d, 13d' are not designed to maintain the oxygen store in the oxygen supply apparatus, the molecular store beds will be exposed to low pressure as the aircraft operates at high altitude thus maintaining the condition of the beds. If desired, the main oxygen supply apparatus 12 may be operated continuously in flight in such a situation, to maintain a small flow of oxygen over the molecular sieve beds of each of the auxiliary oxygen supply apparatus 13, 14 etc.

Figure 3:
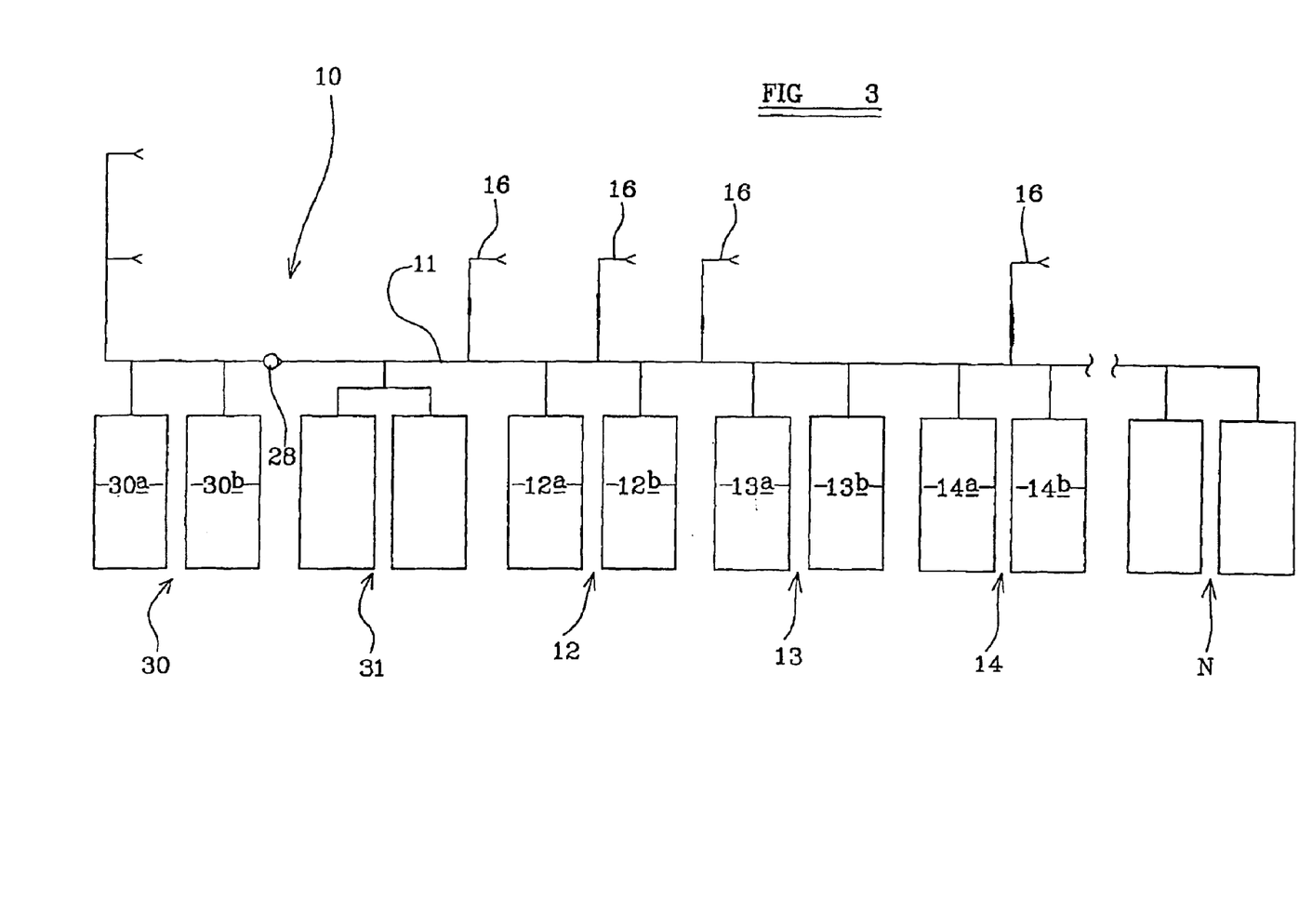
FIG. 3 is an alternative illustrative view of a life support system for use in the present invention.

In FIG. 3, it can be seen that preferably the crew has its own oxygen supply apparatus 30, which may again be a pair of molecular sieve bed devices 30a, 30b. Preferably, to provide a supplemental oxygen supply to the crew in the event of failure of their oxygen supply apparatus 30, breathing gas from the breathing gas supply line 11 may be supplied to the crew via a one way valve 28, so that there is no prospect of the crew being deprived of their oxygen supply by oxygen passing from the crew's oxygen supply apparatus 30 to the breathing gas supply line 11.

Breathing gas may be distributed from the breathing gas supply line 11 to passengers' masks 16 via a plurality of 10 may include a spare oxygen supply apparatus 31.

Where each of the main 12 and auxiliary 13 oxygen supply apparatus is the same, i.e. is an MSOGS of generally the same capacity, it will be appreciated that any of the oxygen supply apparatus 12, 13 etc. may perform the role of the main oxygen supply apparatus. Preferably the selection of an oxygen supply apparatus 12, 13 to use as a main oxygen supply apparatus is sequenced so that each oxygen supply apparatus 12, 13 etc. takes a turn at supplying oxygen enriched gas to purge the other beds and provide an emergency oxygen store. Thus, prior to each flight, or a plurality of flights or after so many flying hours, a different main oxygen supply apparatus 12, 13 etc., is selected. In this way, each bed will age similarly.

The two beds 12a, 12b of the main oxygen supply apparatus 12 and each of the auxiliary oxygen supply apparatus 13, 14 etc. when operated, may be operated symmetrically, or asymmetrically as desired.

In a modified example, instead of each oxygen supply apparatus 12, 13 etc. being a two molecular sieve bed 12a, 12b, 13a, 13b device, some or all of the oxygen supply apparatus may have three or more beds, but in each case when the oxygen supply apparatus is operated; at least one bed is preferably active to adsorb non-oxygen gas, whilst another of the beds is being purged.

It will be appreciated that is it desirable to test the performance of individual oxygen supply apparatus 12, 13 etc. To achieve this, preferably periodically each of the oxygen supply apparatus 12, 13 etc. or even each individual bed 12a, 12b, 13a, 13b etc. thereof is operated sequentially with the gas pressure in the breathing gas supply line 11 being monitored as by a pressure sensor 32 and/or with the oxygen concentration in the breathing gas supply line being, monitored e.g. by sensors 33, 34. By monitoring pressure, the performance of the individual inlet and outlet valves 12c, 12d' etc. and the fluid tightness of containers etc. containing the molecular sieve bed materials, can be tested. By monitoring oxygen content of the gas in the breathing gas line 11, the performance, e.g. state of contamination of the molecular material of the beds 12a, 12b, 13a, 13b etc. can be monitored, and in both cases, remedial action taken as necessary.

In another embodiment, the main oxygen supply apparatus 12 need not be a MSOG type device, but may be an alternative type of oxygen supply device such as a gas permeable membrane type or even a ceramic oxygen generating device. In this case, the same main oxygen supply apparatus would always be used to purge the MSOGS beds of the auxiliary oxygen supply apparatus 13, 14 etc. and to provide a supply of stored oxygen.

The invention may be applied to a system in which not all of the auxiliary oxygen supply apparatus 12, 14 etc. are of the molecular sieve type, in which case performance of the method of the invention in respect of those oxygen supply apparatus 13, 14 etc. would be solely for the purpose of creating a store of oxygen for immediate use in the event of an emergency decompression.

It is not necessary to use the life support system according to the present invention to supply oxygen enriched gas to the crew and passengers exclusively in the event of cabin decompression. If it is desired to provide an oxygen supply during normal flight, at least one of the oxygen supply apparatus, typically the main supply apparatus 12, may be isolated from the breathing gas supply line 11, to enable the product gas supply to be available. This product gas supply may be used in conjunction with the environmental control system usually present in an aircraft to maintain a desired oxygen concentration in the pressurized cabin during normal flight. Thus the size of, or even need of, a compressor currently required to introduce external air into the cabin at pressure, may be avoided.

Alternatively the life-support system according to the present invention may be used to provide product gas for medical or therapeutic needs of the crew or passengers of the aircraft.

In order to reduce weight the sizes of the main and auxiliary oxygen supply apparatus 12, 13 etc. may carefully be chosen so that an adequate oxygen supply is available for breathing at the reduced flying height, e.g. a breathing gas supply containing only 80% oxygen, rather than providing larger capacity and heavier oxygen supply apparatus 12, 13 etc. which may be capable of supplying a maximum concentration of oxygen in the breathing gas, which may be up to 97% in the case of molecular sieve beds.

The features disclosed in the foregoing description, or the following claims, or the accompanying drawings, expressed in their specific forms or in terms of a means for performing the disclosed function, or a method or process for attaining the disclosed result, as appropriate, may, separately, or any combination of such features, be utilized for realizing the invention in diverse forms thereof.

We claim:

1. A method of operating a life support system for an aircraft, the system including a plurality of oxygen supply apparatus, each apparatus being operable to supply product gas to a breathing gas supply apparatus, wherein at least one of the oxygen supply apparatus is a main oxygen supply apparatus, and wherein a remainder of the oxygen supply apparatus are auxiliary oxygen supply apparatus, the main oxygen supply apparatus being operable independently of the auxiliary oxygen supply apparatus, the method comprising:

operating the main oxygen supply apparatus in a non-emergency situation; and supplying product gas to each of the auxiliary oxygen supply apparatus.

2. The method according to claim 1, wherein said auxiliary oxygen supply apparatus are each a molecular sieve bed type.

3. The method according to claim 2, wherein said main oxygen supply apparatus is the molecular sieve bed type.

4. The method according to claim 3, said method further comprising:

sequentially selecting an oxygen supply apparatus from the plurality of oxygen supply apparatus; and operating the selected oxygen supply apparatus to be the main oxygen supply apparatus.

5. The method according to claim 2, wherein the molecular sieve beds are opened to low pressure atmosphere at high altitudes.

6. The method according to claim 2, wherein, at least one of the auxiliary oxygen supply apparatus has at least two active molecular sieve beds which when operated are operated in tandem such that while one sieve bed is adsorbing non-oxygen gas from a pressurized gas supply, the other bed is being purged of non-oxygen gas by subjecting the bed to lower pressure.

7. The method according to claim 2, wherein, at least one of the auxiliary oxygen supply apparatus has three molecular sieve beds, the three beds being operated such that at least one of the beds is adsorbing non-oxygen gas from a pressurized gas supply while another of the three beds is being purged of non-oxygen gas.

8. The method according to claim 1, wherein said auxiliary oxygen supply apparatus and any ancillary connection hoses are used to store supplied product gas which is immediately available for breathing while the oxygen supply apparatus are brought on line in the event of a demand or an increased demand for product gas.

9. The method according to claim 1, wherein each of the main and auxiliary oxygen supply apparatus comprises an inlet for supply gas, an outlet for product gas, and a vent used during purging.

10. The method according to claim 9, wherein each of said inlets for the auxiliary oxygen supply apparatus and the vents has a valve device which is closable while the main oxygen supply apparatus is operate to enable the auxiliary supply apparatus to be filled with product gas for storage when the main oxygen supply is operated.

11. The method according to claim 1, further comprising:

testing a performance of each auxiliary oxygen supply apparatus by sequentially operating each of the auxiliary oxygen supply apparatus; and monitoring at least one of a pressure of and an oxygen concentration in the oxygen-enriched gas supplied in the breathing gas supply apparatus.

12. A method of operating a passenger aircraft in the event of an emergency cabin decompression, the method comprising:

operating a life support system, said system having a plurality of oxygen supply apparatus, each apparatus being operable to supply product gas to a breathing gas supply apparatus, wherein at least one of the oxygen supply apparatus is a main oxygen supply apparatus and a remainder of the oxygen supply apparatus are auxiliary oxygen supply apparatus, the main oxygen supply apparatus being operable independently of the auxiliary oxygen supply apparatus;

operating the main oxygen supply apparatus;

supplying product gas to each of the auxiliary oxygen supply apparatus;

reducing flying altitude to a holding altitude of greater than 10,000 feet; and continuing to fly the aircraft at the holding altitude while the passengers are supplied with breathing gas from the life support system.

13. The method of claim 12, the step of reducing flying altitude comprising:

reducing flying altitude to a holding altitude of greater than 15,000 feet.

14. The method of claim 13, the step of reducing flying altitude comprising:

reducing flying altitude to a holding altitude of between 20,000 and 25,000 feet.

15. A life support system for an aircraft comprising:

a plurality of oxygen supply means for supplying product gas to a breathing gas supply apparatus, at least one of the oxygen supply means is a main oxygen supply apparatus, and a remainder of the oxygen supply means is an auxiliary oxygen supply apparatus, the main oxygen supply apparatus being operable independently of the auxiliary oxygen supply apparatus, said oxygen supply means for operating the main oxygen supply apparatus in a non-emergency situation and for supplying product gas to each of the auxiliary oxygen supply apparatus.

16. The system according to claim 15, further comprising:

an ancillary oxygen supply means for use by a crew in the event of an emergency, said oxygen supply means for allowing a supply of product gas from the main and auxiliary oxygen supply apparatus to be used to supplement or replace the product gas supply provided by the ancillary oxygen supply means, but to prevent product gas from the ancillary oxygen supply apparatus from passing into the breathing gas supply apparatus of the main and auxiliary oxygen supply apparatus.

17. The system according to claim 15, wherein said main and auxiliary oxygen supply apparatus are arranged in one of a linear and radial array with at least one of a gas supply inlet and a product gas outlet for each oxygen supply apparatus provided by a common plenum.

18. An aircraft having a life support system, the system comprising:

a plurality of oxygen supply means, each oxygen supply means for supplying product gas to a breathing gas supply apparatus wherein at least one of the oxygen supply means is a main oxygen supply apparatus, and wherein a remainder of the oxygen supply means are auxiliary oxygen supply apparatus, the main oxygen supply apparatus being operable independently of the auxiliary oxygen supply apparatus, said oxygen supply means for operating the main oxygen supply apparatus and for supplying product gas to each of the auxiliary oxygen supply apparatus.

* * * * *

UNITED STATES PATENT AND TRADEMARK OFFICE
CERTIFICATE OF CORRECTION

PATENT NO. : 6,846,347 B2
DATED : January 25, 2005
INVENTOR(S) : Phillips, Robert John et al.

It is certified that error appears in the above-identified patent and that said Letters Patent is hereby corrected as shown below:

Title page,
Item [73], Assignee, please delete "Normaliar-Garrett" and substitute therefor
-- Normalair-Garrett --

Signed and Sealed this

Thirty-first Day of May, 2005

JON W. DUDAS
*Director of the United States Patent and Trademark Office*